C. H. HACKETT.
CREAM EXIT FOR CENTRIFUGAL CREAM SEPARATORS.
APPLICATION FILED MAY 11, 1907.

914,487.

Patented Mar. 9, 1909.

WITNESSES:
O. D. Young.
D. A. Kennedy

INVENTOR
Charles H. Hackett,
BY
G. C. Kennedy.
ATTORNEY

UNITED STATES PATENT OFFICE.

CHARLES H. HACKETT, OF WATERLOO, IOWA, ASSIGNOR TO WILBUR W. MARSH, OF WATERLOO, IOWA.

CREAM-EXIT FOR CENTRIFUGAL CREAM-SEPARATORS.

No. 914,487.     Specification of Letters Patent.     Patented March 9, 1909.

Application filed May 11, 1907. Serial No. 373,180.

*To all whom it may concern:*

Be it known that I, CHARLES H. HACKETT, a citizen of the United States of America, and a resident of Waterloo, Blackhawk county, Iowa, have invented certain new and useful Improvements in Cream-Exits for Centrifugal Cream-Separators, of which the following is a specification.

My invention relates to improvements in centrifugal liquid separators, and the object of my improvement is to provide a new and improved eduction-tube for the exit of the lighter constituent of the liquid to be separated, so arranged as to be adjustable at varying distances from the axis of the separator bowl. This object I have effected by the means which are hereinafter described and claimed, and which are illustrated in the accompanying drawings, in which—

Figure 1:
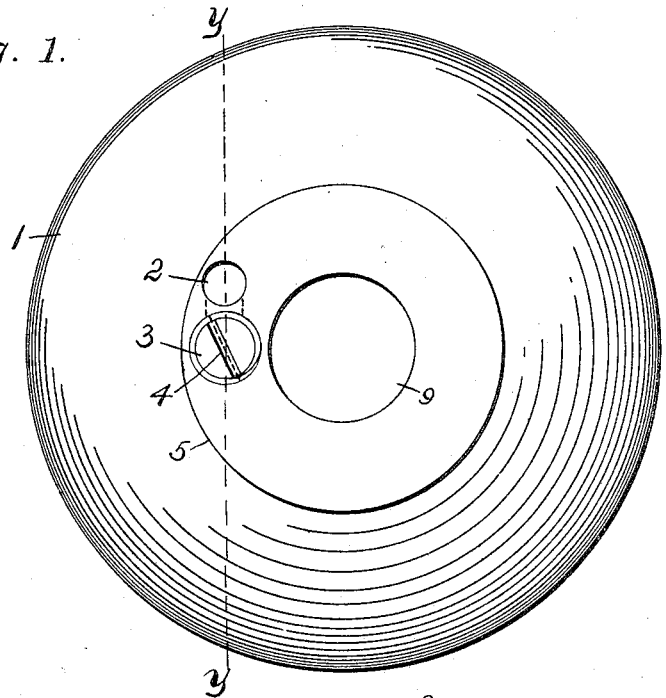
Figure 2:
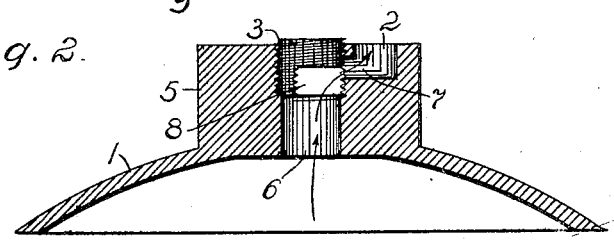
Figure 3:
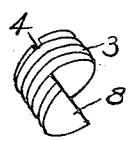

Figure 1 is a plan view of the cover of a separator bowl showing the arrangement of my improved cream eduction-tube or exit, Fig. 2 is a section of the same on the line $y$—$y$ taken vertically through such cover, and Fig. 3 is a detail perspective view of the cut-away plug used in the cream exit.

Similar numbers refer to similar parts throughout the several views.

The separator bowl cover 1 is of a well known type, having a central opening 9 for the milk inlet. The ring 5 on its upper part is concentric with the opening 9, having the same axis, and is provided with an opening 6, which affords communication between the inside of the bowl at a point approximately located at the outer edge of the cream zone, and the outside of the bowl. The upper part of the vertical opening 6 is threaded, and within it is fitted a threaded plug 3, having on its upper end an ordinary slot 4 for the reception of a screw-driver. One half of the lower end of said plug is cut away, as shown in Fig. 3, for a purpose presently to be described.

A circular well 2 is provided in the upper end of the ring 5, and communicates by means of a horizontal passage 7 with the vertical passage 6, as shown in Fig. 2. The opening 2 is located at the right side of the opening 6. When the screw-plug 3 has been introduced and screwed down a sufficient distance in the opening 6, a communication past the cut away end 8 of the plug is established between the pit 2 and passage 7 and the opening 6. The vertical edge of the cut-away part 8 which is adjacent to the outer wall of the passage 7 then forms an adjustable limit to the flow of cream therethrough in varying its radial distance from the axis of the bowl. When the plug 3 is turned to the right the advancing edge of the cut-away limb 8 causes the flow of cream past it to approach the axis of the bowl, but when said plug is turned in the opposite direction, the current, under the influence of centrifugal force, has a greater limit radially than before. The wider limit is of use in skimming milk when it is desired to have the cream thinned with an admixture of milk to a desired degree, the increased area of the passage 7 aiding in this case in the voiding of the cream current of larger volume. When the plug is turned so as to decrease the distance of the working edge of the limb 8 from the axis of the bowl and also decrease the cream exit 7 in area, such decreased area is sufficient for the smaller quantity of richer cream which is carried therethrough. The cutting away of the plug 3 to its center line, thus affords a large passage for the separated cream, said passage being limited at will as above described.

Having described my invention, what I claim as new, and desire to secure by Letters Patent, is—

In an exit for centrifugal cream separators, the combination with the bowl of the separator of a screw plug threaded into a vertical opening of said bowl, said plug having a cut-away portion which extends from the bottom of the plug and throughout only a portion of the length of said plug, and a transverse passage leading from the first named passage, said plug controlling the passage of fluid from said first named passage to the last named passage.

Signed at Waterloo, Iowa, this 24th day of April 1907.

CHARLES H. HACKETT.

Witnesses:
   O. D. YOUNG,
   G. C. KENNEDY.